United States Patent
Song et al.

(10) Patent No.: US 12,389,338 B2
(45) Date of Patent: Aug. 12, 2025

(54) TRANSMISSION POWER ALLOCATION METHOD AND USER EQUIPMENT THEREOF

(71) Applicant: MediaTek Singapore Pte. Ltd., Singapore (SG)

(72) Inventors: Zhen Song, Beijing (CN); Long Liu, Beijing (CN); Yan Wu, Beijing (CN); Wei Tang, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 466 days.

(21) Appl. No.: 18/050,618

(22) Filed: Oct. 28, 2022

(65) Prior Publication Data
US 2024/0107462 A1    Mar. 28, 2024

(30) Foreign Application Priority Data
Sep. 22, 2022  (CN) ........................ 202211161284.3

(51) Int. Cl.
*H04W 52/24* (2009.01)
*H04W 52/32* (2009.01)
*H04W 52/36* (2009.01)

(52) U.S. Cl.
CPC ....... *H04W 52/242* (2013.01); *H04W 52/325* (2013.01); *H04W 52/36* (2013.01)

(58) Field of Classification Search
None
See application file for complete search history.

(56) References Cited

U.S. PATENT DOCUMENTS

| | | | | |
|---|---|---|---|---|
| 9,215,650 | B2 * | 12/2015 | Jung | H04W 72/02 |
| 10,880,841 | B2 * | 12/2020 | Lee | H04W 52/242 |
| 2013/0064131 | A1 * | 3/2013 | Kwon | H04W 52/365 |
| | | | | 370/252 |
| 2013/0100828 | A1 * | 4/2013 | Kishiyama | H04W 52/242 |
| | | | | 370/252 |
| 2013/0217404 | A1 * | 8/2013 | Jung | H04W 52/04 |
| | | | | 455/452.1 |
| 2014/0162717 | A1 * | 6/2014 | Liu | H04W 52/40 |
| | | | | 455/522 |
| 2020/0358511 | A1 * | 11/2020 | Hyung | H04W 52/242 |
| 2021/0105725 | A1 | 4/2021 | Karjakainen et al. | |
| 2022/0182979 | A1 * | 6/2022 | Freda | H04W 72/0453 |
| 2022/0210744 | A1 * | 6/2022 | Ren | H04W 52/242 |
| 2022/0260709 | A1 * | 8/2022 | Lee | H04W 52/02 |
| 2023/0269669 | A1 | 8/2023 | Jin et al. | |

FOREIGN PATENT DOCUMENTS

| | | |
|---|---|---|
| WO | 2022/042257 A1 | 3/2022 |
| WO | 2022/131766 A1 | 6/2022 |

OTHER PUBLICATIONS

Chinese language office action dated Jun. 12, 2023, issued in application No. TW 111140824.

\* cited by examiner

*Primary Examiner* — Pablo N Tran

(74) *Attorney, Agent, or Firm* — McClure, Qualey & Rodack, LLP

(57) ABSTRACT

A transmission power allocation method is provided. The transmission power allocation method is applied in user equipment (UE). The transmission power allocation method includes the following steps. The UE calculates the target power. The UE calculates the path loss of each antenna of the UE. The UE adjusts the transmission power of each antenna, except for a first antenna which corresponds to the maximum path loss, based on the maximum path loss.

12 Claims, 4 Drawing Sheets

TRANSMISSION POWER ALLOCATION METHOD AND USER EQUIPMENT THEREOF

CROSS REFERENCE TO RELATED APPLICATIONS

This application claims priority of CN Patent Application No. 202211161284.3 filed on Sep. 22, 2022, the entirety of which is incorporated by reference herein.

BACKGROUND OF THE INVENTION

Field of the Invention

The invention generally relates to wireless communication technology, and more particularly, to a transmission (Tx) power allocation technology.

Description of the Related Art

GSM/GPRS/EDGE technology is also called 2G cellular technology, WCDMA/CDMA-2000/TD-SCDMA technology is also called 3G cellular technology, and LTE/LTE-A/TD-LTE technology is also called 4G cellular technology. These cellular technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

In addition, with conventional communication technology, multi-antenna technology has been widely applied in the uplink transmissions performed by user equipment (UE). However, because the transmission environment may be complex and has high uncertainty, the modulation difficulty for the received signal form the multi-path from the UE in the network node may be increased.

Therefore, how to increase the uplink transmission rate while at the same time reducing power consumption in a UE with multiple antennas is a topic that is worthy of discussion.

BRIEF SUMMARY OF THE INVENTION

A transmission (Tx) power allocation method and user equipment (UE) are provided to overcome the problems mentioned above.

An embodiment of the invention provides a transmission power allocation method. The transmission power allocation method is applied in user equipment (UE). The transmission power allocation method includes the following steps. The UE calculates the target power. The UE calculates the path loss of each antenna of the UE. The UE adjusts the transmission power of each antenna, except for the antenna which corresponds to the maximum path loss, based on the maximum path loss.

In some embodiments, in the transmission power allocation method, when the path loss is the same in all the antennas, the UE splits the target power equally across each antenna port as the transmission power of each antenna.

In some embodiments, when the UE comprises two antennas, the transmission power allocation method further comprises that the UE calculates the gap value between the maximum path loss of the first antenna and the path loss of the second antenna, wherein the gap value is the absolute value of the difference between the maximum path loss of the first antenna and the path loss of the second antenna. The UE adjusts the transmission power of the second antenna based on the gap value. The transmission power of the first antenna may be the target power minus 3 dB and the transmission power of the second antenna is the target power minus 3 dB and the gap value.

In some embodiments, in the transmission power allocation method, the target power is less than or equal to a default maximum power.

In some embodiments, in the transmission power allocation method, the transmission power of each antenna is applied to physical uplink shared channel (PUSCH), sounding reference signal (SRS) and physical uplink control channel (PUCCH)

An embodiment of the invention provides user equipment (UE) for transmission power allocation. The UE may comprise a plurality of antennas and a processor. The processor is coupled to the plurality of antennas. The processor calculates a target power, calculates path loss of each antenna, and adjusts transmission power of each antenna, except for a first antenna which corresponds to the maximum path loss, based on the maximum path loss.

Other aspects and features of the invention will become apparent to those with ordinary skill in the art upon review of the following descriptions of specific embodiments of the transmission power allocation method and UE.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
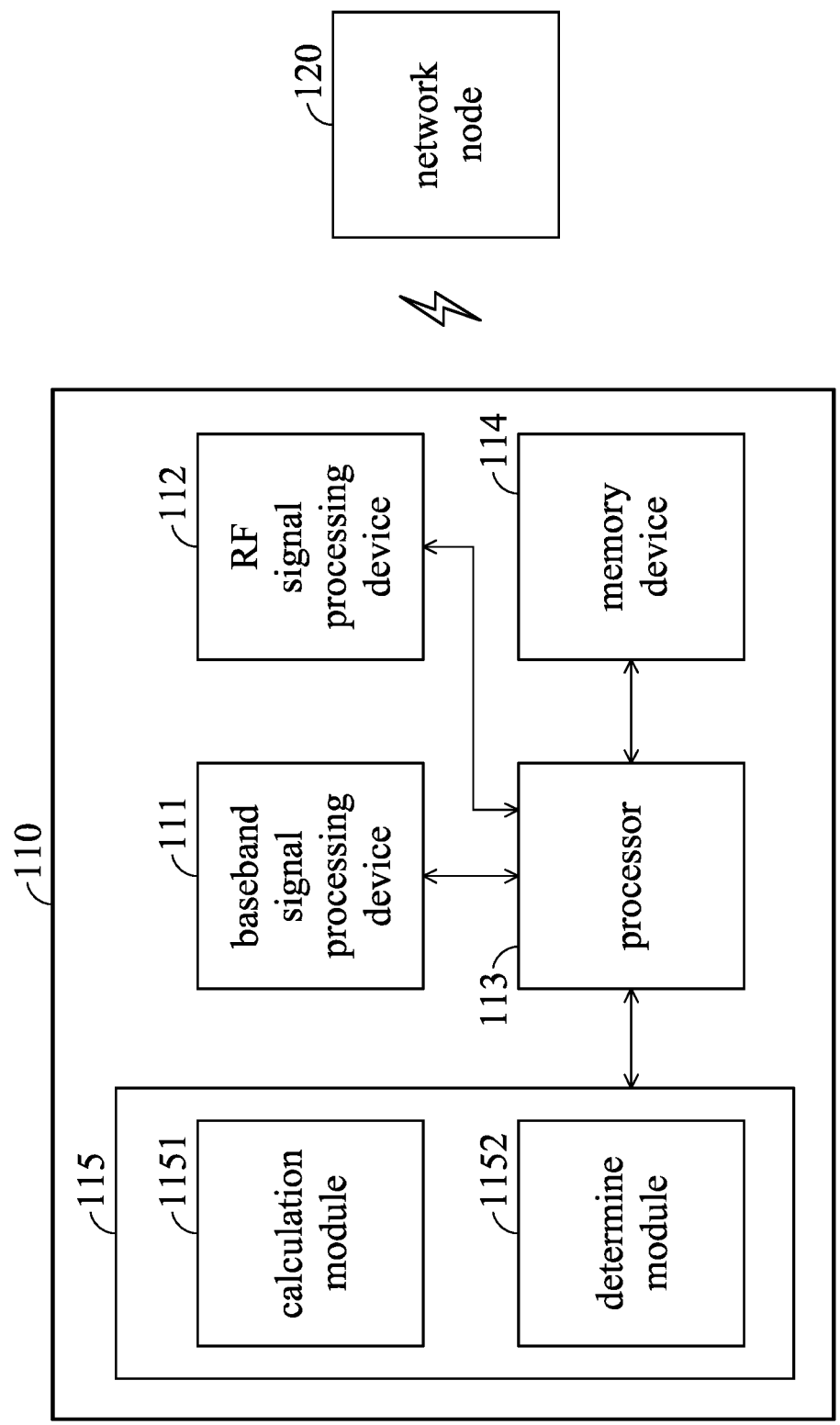
FIG. 1 is a block diagram of a wireless communications system according to an embodiment of the invention.

FIG. 1 is a block diagram of a wireless communications system 100 according to an embodiment of the invention. As shown in FIG. 1, the wireless communications system 100 may comprise user equipment (UE) 110 and a network node 120. It should be noted that in order to clarify the concept of the invention, FIG. 1 presents a simplified block diagram in which only the elements relevant to the invention are shown. However, the invention should not be limited to what is shown in FIG. 1.

In the embodiments, the network node 120 may be a base station, a gNodeB (gNB), a NodeB (NB) an eNodeB (eNB), an access point, an access terminal, but the invention should not be limited thereto. In the embodiments, the UE 110 may communicate with the network node 120 through the fifth generation (5G) communication technology or 5G New Radio (NR) communication technology, but the invention should not be limited thereto.

As shown in FIG. 1, the UE 110 may comprise at least a baseband signal processing device 111, a radio frequency (RF) signal processing device 112, a processor 113, a memory device 114, and function modules and circuits 115.

In the embodiments of the invention, the UE 110 may be a smartphone, Personal Data Assistant (PDA), pager, laptop computer, desktop computer, wireless handset, or any computing device that includes a wireless communications interface.

The RF signal processing device 112 may comprise a plurality of antennas to receive or transmit RF signals. The RF signal processing device 112 may receive RF signals via the antennas and process the received RF signals to convert the received RF signals to baseband signals to be processed by the baseband signal processing device 111, or receive baseband signals from the baseband signal processing device 211 and convert the received baseband signals to RF signals to be transmitted to a peer communications apparatus. The RF signal processing device 112 may comprise a plurality of hardware elements to perform radio frequency conversion. For example, the RF signal processing device 112 may comprise a power amplifier, a mixer, analog-to-digital converter (ADC)/digital-to-analog converter (DAC), etc.

The baseband signal processing device 111 may further process the baseband signals to obtain information or data transmitted by the peer communications apparatus. The baseband signal processing device 111 may also comprise a plurality of hardware elements to perform baseband signal processing.

The processor 113 may control the operations of the baseband signal processing device 111 and the RF signal processing device 112. According to an embodiment of the invention, the processor 113 may also be arranged to execute the program codes of the software module(s) of the corresponding baseband signal processing device 111 and/or the RF signal processing device 112. The program codes accompanied by specific data in a data structure may also be referred to as a processor logic unit or a stack instance when being executed. Therefore, the processor 113 may be regarded as being comprised of a plurality of processor logic units, each for executing one or more specific functions or tasks of the corresponding software modules.

The memory device 114 may store the software and firmware program codes, system data, user data, etc. of the UE 110. The memory device 114 may be a volatile memory such as a Random Access Memory (RAM); a non-volatile memory such as a flash memory or Read-Only Memory (ROM); a hard disk; or any combination thereof.

According to an embodiment of the invention, the RF signal processing device 112 and the baseband signal processing device 111 may collectively be regarded as a radio module capable of communicating with a wireless network to provide wireless communications services in compliance with a predetermined Radio Access Technology (RAT). Note that, in some embodiments of the invention, the UE 110 may be extended further to comprise more than one antenna and/or more than one radio module, and the invention should not be limited to what is shown in FIG. 1.

The function modules and circuits 115 may comprise a calculation module 1151 and a determine module 1152. The processor 113 may execute different modules or circuits in the function modules and circuits 115 to perform embodiments of the present invention. In the embodiment of the invention, the calculation module 1151 may perform calculations for transmission (Tx) power allocation. The determine module 1152 may determine transmission power of each antenna and perform the determine operations for transmission power allocation.

According to an embodiment of the invention, the UE 110 may calculate a target power $P_t$ for transmission power allocation based on the communication standard, e.g., 3GPP standard.

According to an embodiment of the invention, the target power $P_t$ may be less than or equal to a default maximum power $P_{cmax}$. The default maximum power $P_{cmax}$ is specified in the communication standard, e.g., 3GPP standard.

According to an embodiment of the invention, the UE 110 may calculate the path loss of each antenna. The UE 110 may obtain the maximum path loss from the calculated path loss of the antennas. Then, the UE 110 may adjust the transmission power of each antenna, except for the antenna which corresponds to the maximum path loss, based on the maximum path loss. Details are discussed below.

According to an embodiment of the invention, after the UE 110 obtains the maximum path loss, the UE 110 may calculate the gap value between the maximum path loss and the path losses of other antennas. The gap value may be the absolute value of the difference between the maximum path loss and one of the other path losses. Then, the UE 110 may adjust the transmission powers of the antennas, except for the antenna which corresponds to the maximum path loss, based on the gap values between the maximum path loss and other path losses. In the embodiment, the transmission power of the antenna corresponding to the maximum path loss is the target power $P_t$ minus 3 dB (i.e., $P_t$–3 dB) and the transmission power of another antenna is the target power minus 3 dB and the gap value (i.e., $P_t$–3 dB-gap value).

Figure 2A:
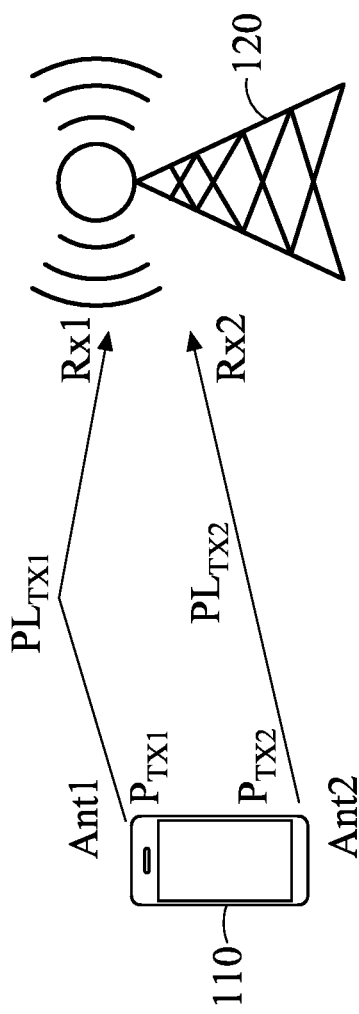
FIG. 2A is a schematic diagram illustrating path loss of each antenna according to an embodiment of the invention.

Taking FIG. 2A as an example, if the UE 110 has two antennas, antenna Ant 1 and antenna Ant 2 and the path loss $PL_{Tx1}$ of the antenna Ant 1 is larger than the path loss $PL_{Tx2}$ of the antenna Ant 2 (i.e., the maximum path loss is the path loss $PL_{Tx1}$), the UE 110 may calculate the gap value $\Delta P_{gap}$ between the path loss $PL_{Tx1}$ and the path loss $PL_{Tx2}$, i.e., the gap value $\Delta P_{gap}$=abs (path loss $PL_{Tx1}$–path loss $PL_{Tx2}$). Then, the UE 110 may adjust the transmission power $P_{Tx2}$ of the antenna Ant 2 based on the gap value $\Delta P_{gap}$, i.e. the transmission power $P_{Tx1}$ of the antenna Ant 1=target power $P_t$–3 dB and the transmission power $P_{Tx2}$ of the antenna Ant 2=target power $P_t$–3 dB-gap value $\Delta P_{gap}$. After the adjustment, the received signal Rx1 from the antenna Ant 1 and the received signal Rx2 from the antenna Ant 2 in the network node 120 may achieve power balance. Therefore, the modulation error in the network node 120 may be reduced.

Figure 2B:
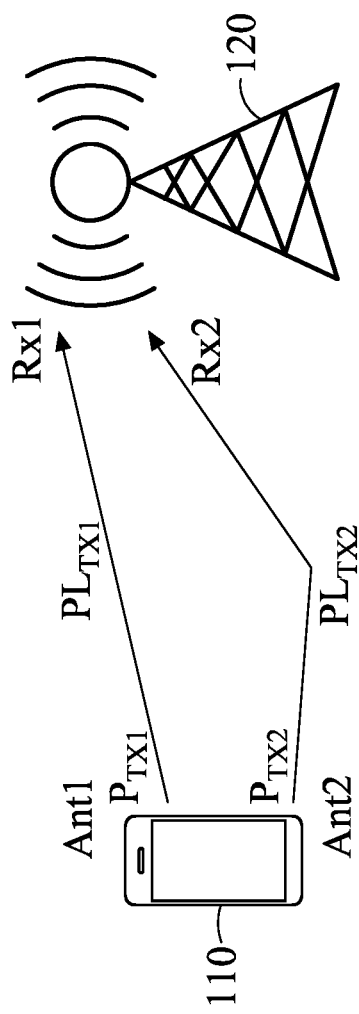
FIG. 2B is a schematic diagram illustrating path loss of each antenna according to another embodiment of the invention.

Taking FIG. 2B as another example, if the UE 110 has two antennas, antenna Ant 1 and antenna Ant 2 and the path loss $PL_{Tx1}$ of the antenna Ant 1 is less than the path loss $PL_{Tx2}$ of the antenna Ant 2 (i.e., the maximum path loss is the path loss $PL_{Tx2}$), the UE 110 may calculate the gap value $\Delta P_{gap}$ between the path loss $PL_{Tx1}$ and the path loss $PL_{Tx2}$, i.e., the gap value $\Delta P_{gap}$=abs (path loss $PL_{Tx1}$–path loss $PL_{Tx2}$). Then, the UE 110 may adjust the transmission power $P_{Tx1}$ of the antenna Ant 1 based on the gap value $\Delta P_{gap}$, i.e. the transmission power $P_{Tx2}$ of the antenna Ant 2=target power $P_t$–3 dB and the transmission power $P_{Tx1}$ of the antenna Ant 1=target power $P_t$–3 dB-gap value $\Delta P_{gap}$. After the adjustment, the received signal Rx1 from the antenna Ant 1 and the received signal Rx2 from the antenna Ant 2 in the network node 120 may achieve power balance. Therefore, the modulation error in the network node 120 may be reduced.

According to an embodiment of the invention, when the path losses of all of the antennas are the same, the UE splits the target power P t equally across each antenna port as the transmission power of each antenna. Taking FIG. 2C as an example, if the UE 110 has two antennas, antenna Ant 1 and antenna Ant 2 and the path loss $PL_{Tx1}$ of the antenna Ant 1 is equal to the path loss $PL_{Tx2}$ of the antenna Ant 2, the transmission power $P_{Tx1}$ of the antenna Ant 1=target power $P_t$–3 dB and the transmission power $P_{Tx2}$ of the antenna Ant 2=target power $P_t$–3 dB.

Figure 2C:
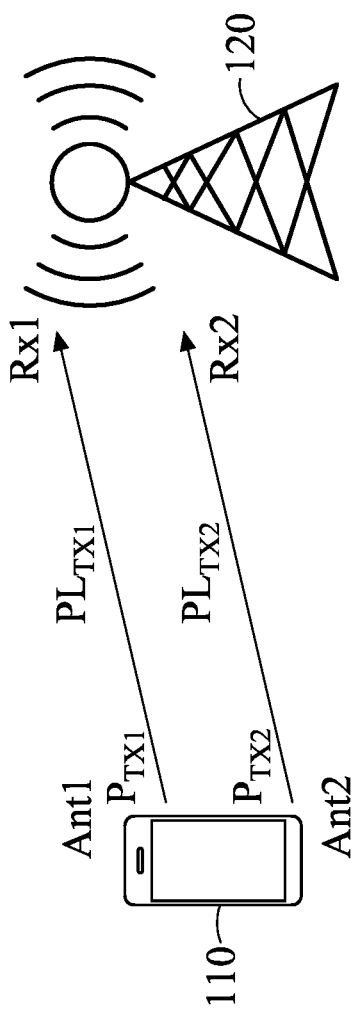
FIG. 2C is a schematic diagram illustrating path loss of each antenna according to another embodiment of the invention.
Figure 3:
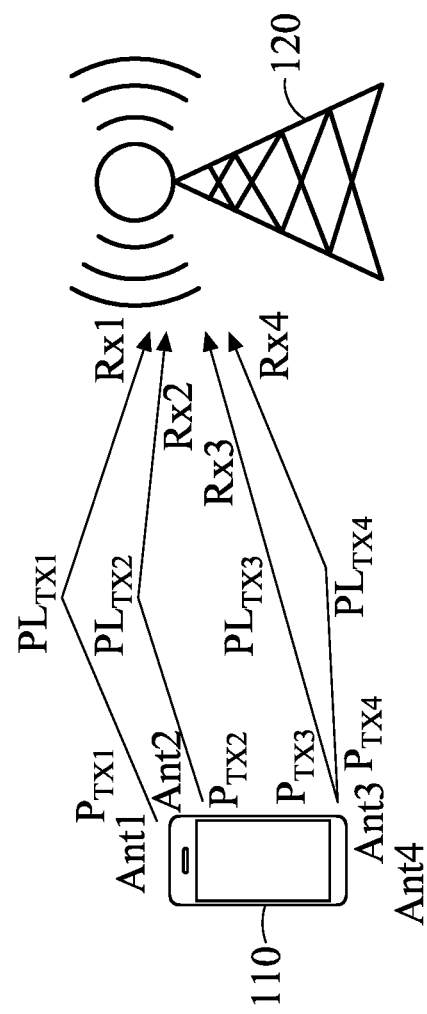
FIG. 3 is a schematic diagram illustrating path loss of each antenna according to another embodiment of the invention.

FIGS. 2A-2C are taken to illustrate the embodiments of the invention, but the invention should not be limited thereto. The UE 110 may comprise other number of antennas. Taking FIG. 3 as an example, if the UE 110 has four antennas, antenna Ant 1, antenna Ant 2, antenna Ant 3 and antenna Ant 4 and the path loss $PL_{Tx1}$ of the antenna Ant 1 is larger than the path loss $PL_{Tx2}$ of the antenna Ant 2, the path loss PL T), 3 of the antenna Ant 3 and the path loss PL T), 4 of the antenna Ant 4 (i.e., the maximum path loss is the path loss $PL_{Tx1}$), the UE 110 may calculate the gap value $\Delta P_{gap1}$ between the path loss $PL_{Tx1}$ and the path loss $PL_{Tx2}$, the gap value $\Delta P_{gap2}$ between the path loss $PL_{Tx1}$ and the path loss $PL_{Tx3}$, and the gap value $\Delta P_{gap3}$ between the path loss $PL_{Tx1}$ and the path loss $PL_{Tx4}$, i.e., the gap value $\Delta P_{gap1}$=abs (path loss $PL_{Tx1}$–path loss $PL_{Tx2}$), the gap value $\Delta P_{gap2}$=abs (path loss $PL_{Tx1}$–path loss $PL_{Tx3}$) and the gap value $\Delta P_{gap3}$=abs (path loss $PL_{Tx1}$–path loss $PL_{Tx4}$). Then, the UE 110 may adjust the transmission power $P_{Tx2}$ of the antenna Ant 2 based on the gap value $\Delta P_{gap1}$, adjust the transmission power $P_{Tx3}$ of the antenna Ant 3 based on the gap value $\Delta P_{gap2}$ and adjust the transmission power $P_{Tx4}$ of the antenna Ant 4 based on the gap value $\Delta P_{gap3}$, i.e. the transmission power $P_{Tx1}$ of the antenna Ant 1=target power $P_t$–6 dB, the transmission power $P_{Tx2}$ of the antenna Ant 2=target power $P_t$–6 dB-gap value $\Delta P_{gap1}$, the transmission power $P_{Tx3}$ of the antenna Ant 3=target power $P_t$–6 dB-gap value $\Delta P_{gap2}$ and the transmission power $P_{Tx4}$ of the antenna Ant 4=target power $P_t$–6 dB-gap value $\Delta P_{gap3}$. After the adjustment, the received signal Rx1 from the antenna Ant 1, the received signal Rx2 from the antenna Ant 2, the received signal Rx3 from the antenna Ant 3 and the received signal Rx4 from the antenna Ant 4 in the network node 120 may achieve power balance. Therefore, the modulation error in the network node 120 may be reduced. According to another embodiment of the invention, when the path losses of all of the antennas Ant 1-Ant 4 are the same, the UE splits the target power P t equally across each antenna port as the transmission power of each antenna. That is to say, the transmission power of each antenna is the target power minus 6 dB.

According to the embodiments of the invention, the transmission power of each antenna of UE 110 may be applied to physical uplink shared channel (PUSCH), sounding reference signal (SRS) and physical uplink control channel (PUCCH), but the invention should not be limited thereto.

Figure 4:
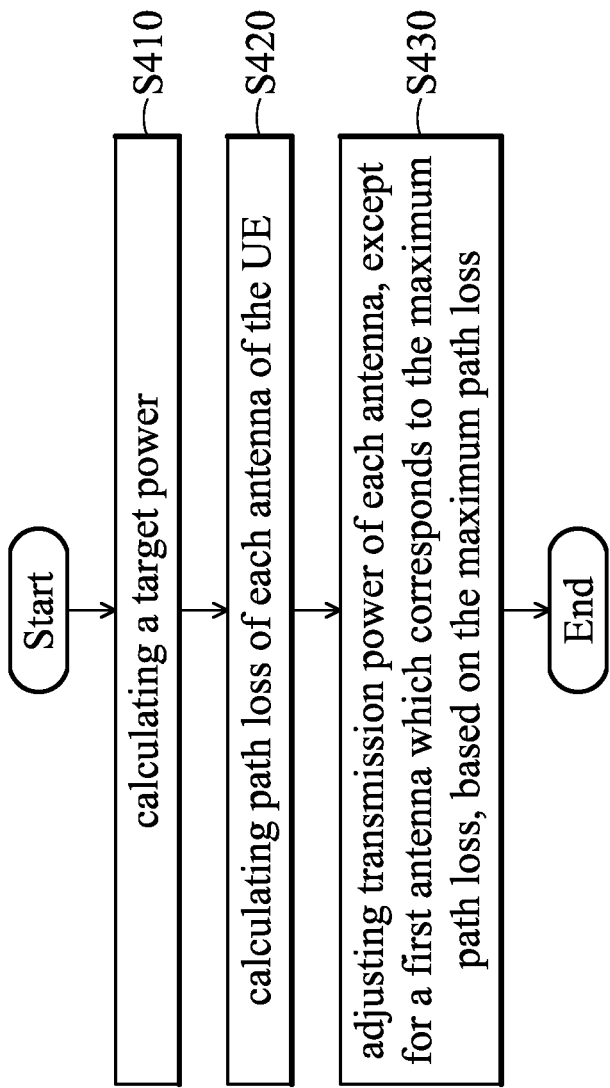
FIG. 4 is flow chart illustrating a transmission power allocation method according to an embodiment of the invention.

FIG. 4 is a flow chart illustrating a transmission power allocation method according to an embodiment of the invention. The transmission power allocation method can be applied to the communication system 100 which comprises the UE 110. As shown in FIG. 4, in step S410, the UE 110 may calculate a target power.

In step S420, the UE 110 may calculate path loss of each antenna of the UE 110.

In step S430, the UE 110 may adjusts transmission power of each antenna, except for a first antenna which corresponds to the maximum path loss, based on the maximum path loss.

In an embodiment of the invention, in the transmission power allocation method, when path loss is the same in all the antennas, the UE splits the target power equally across each antenna port as the transmission power of each antenna.

In an embodiment of the invention, in the transmission power allocation method, the UE 110 may calculate the gap value between the maximum path loss of the first antenna and the path loss of a second antenna, wherein the gap value is the absolute value of the difference between the maximum path loss of the first antenna and the path loss of the second antenna. Then, the UE 110 may adjust the transmission power of the second antenna based on the gap value. In the embodiment, when the UE 110 comprises two antennas, the transmission power of the first antenna is the target power minus 3 dB and the transmission power of the second antenna is the target power minus 3 dB and the gap value.

In an embodiment of the invention, in the transmission power allocation method, the target power is less than or equal to a default maximum power.

In the transmission power allocation methods provided in the invention, the transmission power of the antenna with less path loss will be reduced. Therefore, when the network node receives signals from different antennas of the UE, the modulation error can be reduced and the uplink rate will be increased. In addition, in the transmission power allocation methods provided in the invention, the power consumption of the UE also can be reduced.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A transmission power allocation method, applied in a user equipment (UE), comprising:
    calculating a target power for a transmission power allocation of each antenna;
    calculating path loss of each antenna of the UE; and
    adjusting transmission power of each antenna, except for a first antenna which corresponds to a maximum path loss, based on the target power and a gap value between the maximum path loss and path losses of other antennas.

2. The transmission power allocation method of claim 1, wherein when the path loss is the same in all antennas, the UE splits the target power equally across each antenna port as the transmission power of each antenna.

3. The transmission power allocation method of claim 1, wherein when the UE comprises two antennas, the method further comprising:
    calculating the gap value between the maximum path loss of the first antenna and the path loss of a second antenna; and
    adjusting the transmission power of the second antenna based on the gap value,
    wherein the gap value is an absolute value of a difference between the maximum path loss of the first antenna and the path loss of the second antenna.

4. The transmission power allocation method of claim 3, wherein the transmission power of the first antenna is the target power minus 3 dB and the transmission power of the second antenna is the target power minus 3 dB and the gap value.

5. The transmission power allocation method of claim 1, wherein the target power is less than or equal to a default maximum power.

6. The transmission power allocation method of claim 1, wherein the transmission power of each antenna is applied to physical uplink shared channel (PUSCH), sounding reference signal (SRS) and physical uplink control channel (PUCCH).

7. A user equipment (UE) for transmission power allocation, comprising:
    a plurality of antennas; and
    a processor, coupled to the plurality of antennas, calculating a target power for a transmission power allocation of each antenna, calculating path loss of each antenna, and adjusting transmission power of each antenna, except for a first antenna which corresponds to a maximum path loss, based on the target power and a gap value between the maximum path loss and path losses of other antennas.

8. The UE of claim 7, wherein when the path loss is the same in all antennas, the processor splits the target power equally across each antenna port as the transmission power of each antenna.

9. The UE of claim 7, wherein when the UE comprises two antennas, the processor calculates the gap value between the maximum path loss of the first antenna and the path loss of a second antenna and adjusts the transmission power of the second antenna based on the gap value, wherein the gap value is an absolute value of a difference between the maximum path loss of the first antenna and the path loss of the second antenna.

10. The UE of claim 9, wherein the transmission power of the first antenna is the target power minus 3 dB and the transmission power of the second antenna is the target power minus 3 dB and the gap value.

11. The UE of claim 7, wherein the target power is less than or equal to a default maximum power.

12. The UE of claim 7, wherein the transmission power of each antenna is applied to physical uplink shared channel (PUSCH), sounding reference signal (SRS) and physical uplink control channel (PUCCH).

* * * * *